United States Patent
Sambongi et al.

(10) Patent No.: US 10,081,515 B2
(45) Date of Patent: Sep. 25, 2018

(54) METHOD FOR MEASURING SHAFT AND INTERFERENCE DETERMINATION SYSTEM

(71) Applicant: MITSUBISHI ELECTRIC CORPORATION, Chiyoda-ku (JP)

(72) Inventors: Keisuke Sambongi, Tokyo (JP); Ryoji Tanaka, Tokyo (JP); Shinji Ishiguro, Tokyo (JP)

(73) Assignee: MITSUBISHI ELECTRIC CORPORATION, Chiyoda-ku (JP)

( * ) Notice: Subject to any disclaimer, the term of this patent is extended or adjusted under 35 U.S.C. 154(b) by 0 days.

(21) Appl. No.: 15/309,454

(22) PCT Filed: Apr. 17, 2015

(86) PCT No.: PCT/JP2015/061853
§ 371 (c)(1),
(2) Date: Nov. 8, 2016

(87) PCT Pub. No.: WO2015/190173
PCT Pub. Date: Dec. 17, 2015

(65) Prior Publication Data
US 2017/0183199 A1 Jun. 29, 2017

(30) Foreign Application Priority Data

Jun. 9, 2014 (JP) .................. 2014-118776

(51) Int. Cl.
*G01B 11/14* (2006.01)
*B66B 5/00* (2006.01)
(Continued)

(52) U.S. Cl.
CPC ............ *B66B 5/0031* (2013.01); *B66B 5/02* (2013.01); *G01B 11/14* (2013.01); *G01S 17/08* (2013.01)

(58) Field of Classification Search
CPC ......... B66B 5/0031; B66B 5/02; G01S 17/08; G01B 11/14; G01B 11/24; H05K 13/08
(Continued)

(56) References Cited

U.S. PATENT DOCUMENTS 4,541,011 A * 9/1985 Mayer .................... G01N 21/89
250/559.46
5,371,375 A * 12/1994 Stern .................... G01B 11/022
250/559.29
(Continued)

FOREIGN PATENT DOCUMENTS

JP 2003066143 A * 3/2003
JP 2004037203 A * 2/2004
(Continued)

OTHER PUBLICATIONS

International Search Report dated Jul. 14, 2015 in PCT/JP2015/061853 filed Apr. 17, 2015.
(Continued)

*Primary Examiner* — Isiaka Akanbi
(74) *Attorney, Agent, or Firm* — Oblon, McClelland, Maier & Neustadt, L.L.P.

(57) ABSTRACT

A measurement apparatus is attached to a guide rail above a car. Next, a measurement by the measurement apparatus is performed, and first dimensional data including dimensional data on an upper part of a shaft is acquired. The measurement apparatus is detached from the guide rail, and the car is moved upward and then stopped. The measurement apparatus is attached to the guide rail below the car after the car is stopped. A measurement by the measurement apparatus is performed, and second dimensional data including dimensional data on a lower part of the shaft is acquired. The
(Continued)

No. 1 : MEASUREMENT APPARATUS
No. 2 : DATA ACQUISITION UNIT
No. 3 : STORAGE UNIT
No. 4 : DATA INTEGRATION UNIT
No. 5 : COMPARISON UNIT
No. 6 : NOTIFICATION APPARATUS
No. 7 : INPUT APPARATUS
No. 9 : EMISSION UNIT
No. 10: RECEPTION UNIT
No. 11: MEASUREMENT UNIT acquired first dimensional data and the acquired second dimensional data are integrated, and dimensional data on the entire shaft is created.

9 Claims, 7 Drawing Sheets

(51) Int. Cl.
*G01S 17/08* (2006.01)
*B66B 5/02* (2006.01)

(58) Field of Classification Search
USPC .................. 356/601–626, 445, 237.2–237.6
See application file for complete search history.

(56) References Cited

U.S. PATENT DOCUMENTS 6,710,867 B2 * 3/2004 Bellm .................. G01B 11/24
356/237.1

2009/0273788 A1 * 11/2009 Nagle, II ................. B61K 9/08
356/445

FOREIGN PATENT DOCUMENTS

| JP | 2006-62796 | 3/2006 |
|----|------------|--------|
| JP | 4234552 B2 | 3/2009 |
| JP | 4411371 B1 | 2/2010 |
| JP | 2012-193026 | 10/2012 |

OTHER PUBLICATIONS

Extended Search Report dated Sep. 21, 2017 in European Patent Application No. 15807217.3.
Office Action dated Jan. 6, 2018 in Korean Patent Application No. 10-2016-7036006 with unedited computer generated English translation of the Office Action.
Office Action dated Apr. 25, 2018, in Chinese Patent Application No. 201580030536.0 (with English language translation).

* cited by examiner

No. 1 : MEASUREMENT APPARATUS
No. 2 : DATA ACQUISITION UNIT
No. 3 : STORAGE UNIT
No. 4 : DATA INTEGRATION UNIT
No. 5 : COMPARISON UNIT
No. 6 : NOTIFICATION APPARATUS
No. 7 : INPUT APPARATUS
No. 9 : EMISSION UNIT
No. 10: RECEPTION UNIT
No. 11: MEASUREMENT UNIT

Fig. 7a
Fig. 7b
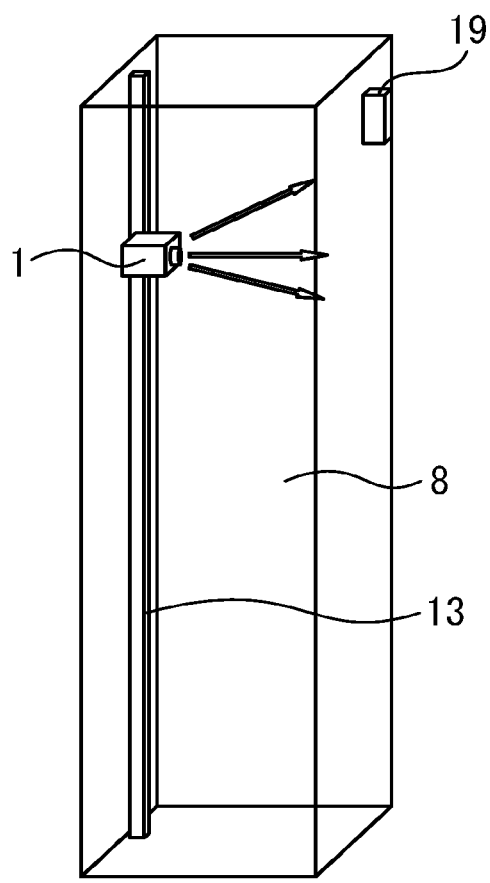
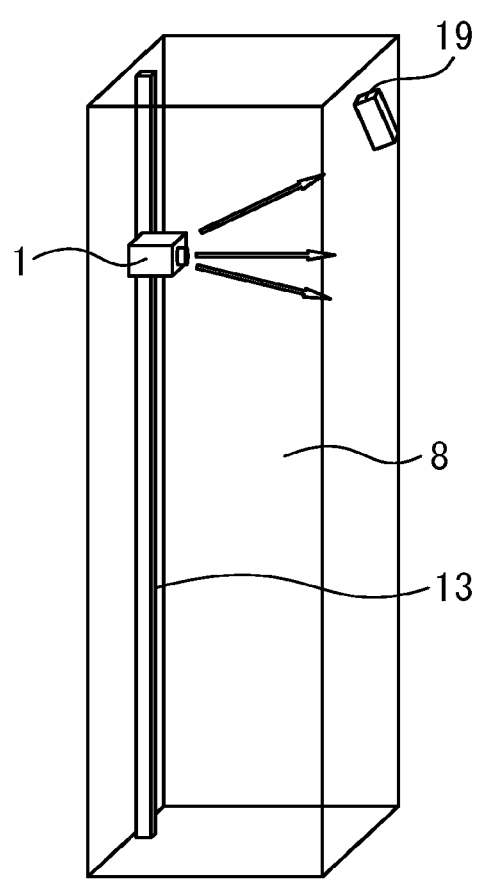

METHOD FOR MEASURING SHAFT AND INTERFERENCE DETERMINATION SYSTEM

FIELD

The present invention relates to a method for measuring dimensions of a shaft and to an interference determination system.

BACKGROUND

When an elevator is reformed, a part of or all of devices thereof are replaced. In addition, unnecessary devices are removed and necessary devices are newly added. Performing such work requires accurate dimensional data on a current shaft. For example, when there is not enough space to install a new device, to what extent a wall of the shaft needs to be scraped off has to be determined on the basis of the dimensional data.

Patent Literature 1 describes a system for measuring dimensions of a shaft. The system described in Patent Literature 1 includes a laser range finder. The laser range finder is provided on an elevator car. With the laser range finder, a distance to a wall of the shaft is measured while the car moves.

CITATION LIST

Patent Literature

PTL 1: Japanese Patent No. 4234552

SUMMARY

Technical Problem

The laser range finder described in Patent Literature 1 is provided on an elevator car. Therefore, shaft portions below the car cannot be measured with the laser range finder. In other words, dimensional data on an entire shaft cannot be obtained with the system described in Patent Literature 1.

The present invention has been made in order to solve such a problem. An object of the present invention is to provide a method for measuring a shaft, which enables dimensional data on an entire shaft to be obtained. Another object of the present invention is to provide an interference determination system which uses dimensional data obtained by the method.

Solution to Problem

A method for measuring a shaft according to the invention comprises a step of attaching, above a car of an elevator, a measurement apparatus to a guide rail in the shaft, a step of performing a measurement with the measurement apparatus after the measurement apparatus is attached to the guide rail, and acquiring first dimensional data including dimensional data on an upper part of the shaft, a step of detaching the measurement apparatus from the guide rail after the first dimensional data is acquired, and moving the car upward and then stopping the car, a step of attaching the measurement apparatus to the guide rail below the car after the car is stopped, a step of performing a measurement with the measurement apparatus after the measurement apparatus is attached to the guide rail, and acquiring second dimensional data including dimensional data on a lower part of the shaft, and a step of integrating the acquired first dimensional data and the acquired second dimensional data, and creating dimensional data on the entire shaft.

Also, a method for measuring a shaft according to the invention comprises a step of attaching, below a car of an elevator, a measurement apparatus to a guide rail in the shaft, a step of performing a measurement with the measurement apparatus after the measurement apparatus is attached to the guide rail, and acquiring first dimensional data including dimensional data on a lower part of the shaft, a step of detaching the measurement apparatus from the guide rail after the first dimensional data is acquired, and moving the car downward and then stopping the car, a step of attaching the measurement apparatus to the guide rail above the car after the car is stopped, a step of performing a measurement with the measurement apparatus after the measurement apparatus is attached to the guide rail, and acquiring second dimensional data including dimensional data on an upper part of the shaft, and a step of integrating the acquired first dimensional data and the acquired second dimensional data, and creating dimensional data on the entire shaft.

An interference determination system according to the invention comprises a storage unit which stores the dimensional data on the entire shaft created by the abovementioned method, a comparison unit which compares dimensional data input from an input apparatus with the dimensional data stored in the storage unit, and a notification apparatus which issues a notification about a comparison result provided by the comparison unit.

Advantageous Effects of Invention

According to the present invention, dimensional data on an entire shaft can be obtained and an interference determination system that uses the dimensional data can be provided.

BRIEF DESCRIPTION OF DRAWINGS

FIG. 7 is a diagram showing a state where a device in the shaft has been displaced by an earthquake.

DESCRIPTION of EMBODIMENTS

The present invention will be described with reference to the accompanying drawings. Redundant descriptions will be simplified or omitted as appropriate. In each of the drawings, the same reference signs refer to the same or comparable parts.

First Embodiment

Figure 1:
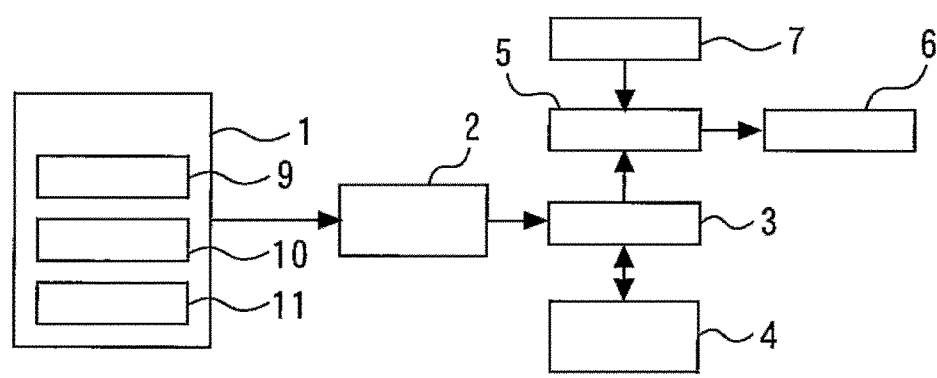
FIG. 1 is a diagram showing an example of an interference determination system according to a first embodiment of the present invention.

FIG. 1 is a diagram showing an example of an interference determination system according to a first embodiment of the present invention.

The present interference determination system includes, for example, a measurement apparatus 1, a data acquisition unit 2, a storage unit 3, a data integration unit 4, a comparison unit 5, a notification apparatus 6, and an input apparatus 7.

The measurement apparatus 1 is an apparatus for acquiring dimensional data on a shaft 8 (not shown in FIG. 1). The measurement apparatus 1 is constituted by, for example, a sensor which three-dimensionally detects a distance to a measurement object in a noncontact manner. For example, the measurement apparatus 1 includes an emission unit 9, a reception unit 10, and a measurement unit 11.

The emission unit 9 emits energy. Examples of energy emitted from the emission unit 9 include light (for example, laser), ultrasonic waves, and electromagnetic waves. The emission unit 9 is provided to be rotatable around two axes, which are orthogonal to each other. Therefore, the emission unit 9 can emit energy in a radial pattern.

The reception unit 10 receives energy (hereinafter, referred to as "reflected energy"), which is from the emission unit 9 and which is reflected by the measurement object. For example, when the emission unit 9 emits laser, the reception unit 10 receives laser reflected by the measurement object.

The measurement unit 11 measures a distance from the measurement apparatus 1 (for example, the emission unit 9) to the measurement object. The measurement unit 11 performs a distance measurement on the basis of energy emitted from the emission unit 9 and reflected energy received by the reception unit 10.

The data acquisition unit 2 acquires data obtained by performing a measurement with the measurement apparatus 1. The data acquisition unit 2 stores the acquired data in the storage unit 3. The data integration unit 4 integrates a plurality of pieces of data to create a single data. The data created by the data integration unit 4 is stored in the storage unit 3. The comparison unit 5 performs data comparison. A comparison result provided by the comparison unit 5 is notified from the notification apparatus 6. For example, a display is adopted as the notification apparatus 6. Alternatively, a speaker may be adopted as the notification apparatus 6. The input apparatus 7 is used when inputting data.

Respective units denoted by reference signs 2, 4, 5, and 10 represent functions of the present interference determination system. The present system is provided with, as a hardware resource, for example, circuitry including an input/output interface, a CPU, and a memory. The storage unit 3 represents a partial function of the memory. The present system implements respective functions of the units 2, 4, 5, and 10 by causing the CPU to execute a program stored in the memory. A part of or all of the functions of the respective units denoted by reference signs 2, 4, 5, and 10 may be implemented by hardware.

Figure 2:
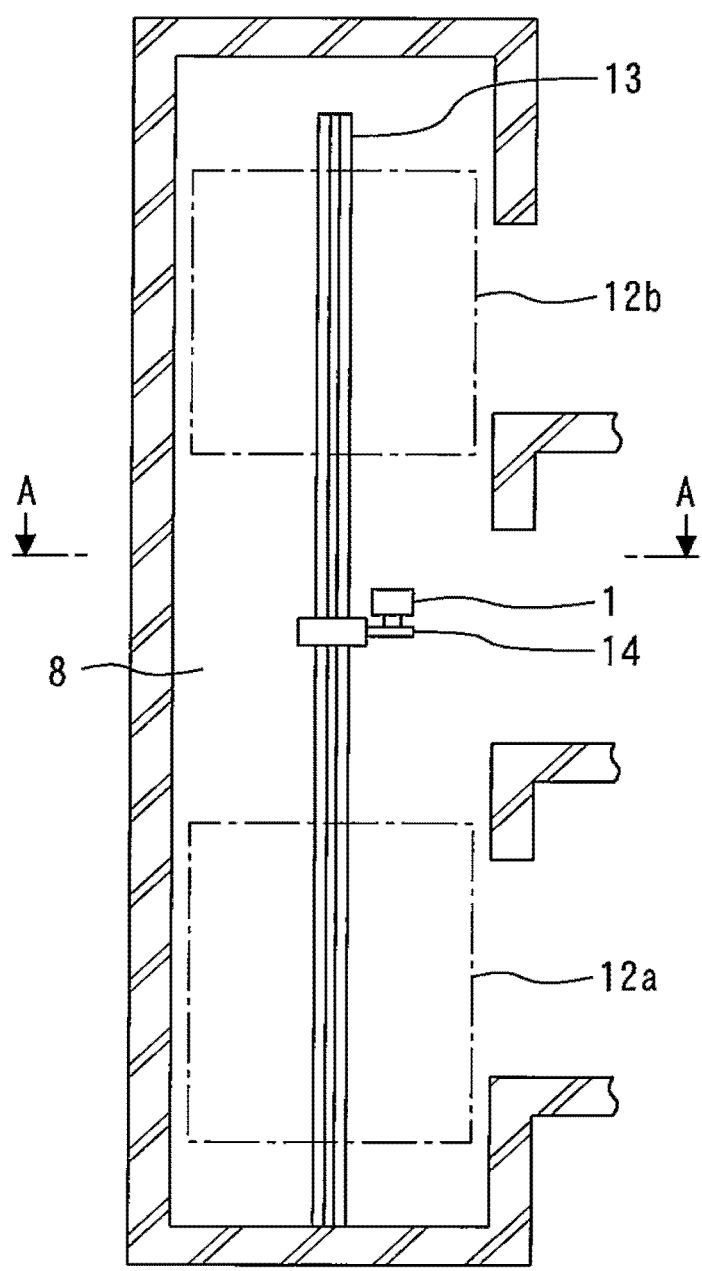
FIG. 2 is a diagram for explaining a method for measuring dimensions of a shaft.

In order to use the present interference determination system, dimensions of the shaft 8 have to be measured. Therefore, with reference also to FIGS. 2 to 6, the present interference determination system as well as a method for measuring dimensions of the shaft 8 will be described below. FIG. 2 is a diagram for explaining a method for measuring dimensions of the shaft 8.

A dimensional measurement of the shaft 8 is performed, for example, when the elevator is reformed. In order to measure the dimensions of the shaft 8, first, a car 12 of the elevator is stopped in a lower part of the shaft 8. For example, the car 12 is stopped at a stop position of a lowermost floor. In FIG. 2, a car stopped at the stop position of the lowermost floor is denoted by a reference sign 12a.

Next, the measurement apparatus 1 is attached to a guide rail 13 for the car 12. The guide rail 13 is a rail for guiding movement of the car 12. The guide rail 13 is vertically provided in the shaft 8 over a range of vertical movement of the car 12. The measurement apparatus 1 is attached to the guide rail 13 above the car 12. Alternatively, the measurement apparatus 1 may be attached to a guide rail for a counterweight (not shown). The guide rail for the counterweight is vertically provided in the shaft 8 over a range of vertical movement of the counterweight.

Figure 3:
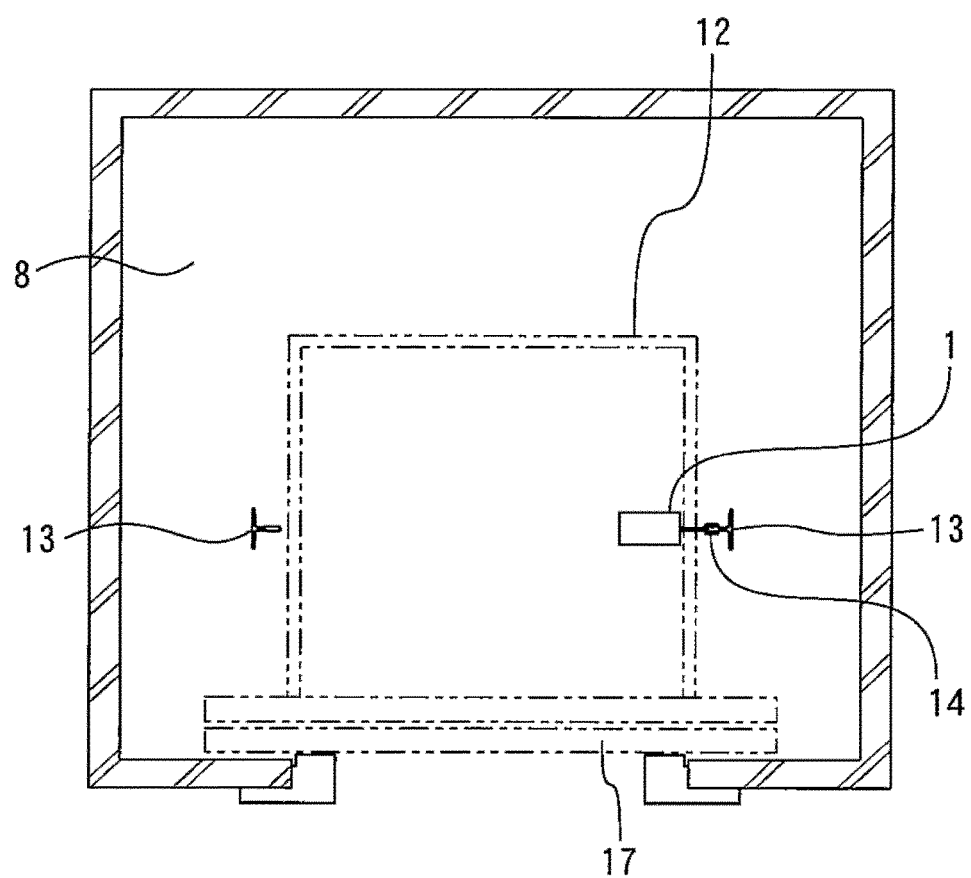
FIG. 3 is a diagram showing a cross section taken along A-A in FIG. 2.

FIG. 3 is a diagram showing a cross section taken along A-A in FIG. 2. The measurement apparatus 1 is provided at an attachment member 14., the measurement apparatus 1 is attached to the guide rail 13 via the attachment member 14. The attachment member 14 is configured so as to be attachable to and detachable from the guide rail 13.

Figure 4:
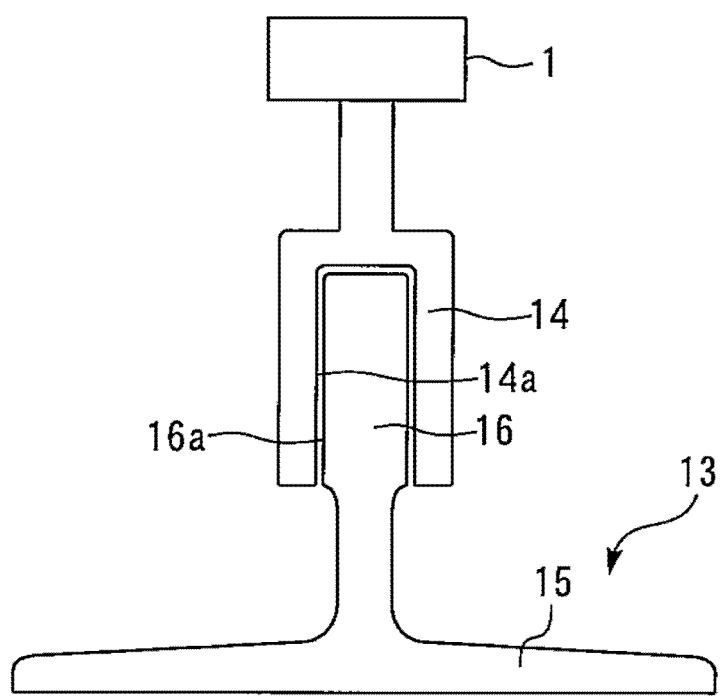
FIG. 4 is a diagram showing a state where a measurement apparatus has been attached to a guide rail.

FIG. 4 is a diagram showing a state where the measurement apparatus 1 has been attached to the guide rail 13. The guide rail 13 for the car 12 has a T-shaped cross section. For example, the guide rail 13 includes a flange section 15 and a guide section 16. The guide section 16 protrudes from the flange section 15. A guide surface 16a for guiding movement of the car 12 is formed on the guide section 16. The guide rail 13 is installed with high precision over the range of vertical movement of the car 12 so that a predetermined distance from a sill 17 in a hall of each floor to the guide surface 16a of the guide section 16 is maintained.

A guide surface 14a is formed on the attachment member 14. The guide surface 14a opposes the guide surface 16a of the guide section 16 when the attachment member 14 is attached to the guide rail 13. When the measurement apparatus 1 is attached to the guide rail 13 via the attachment member 14, the measurement apparatus 1 is arranged to be always on the same position on a horizontal plane of projection with respect to the sill 17 in a hall. In addition, when attached to the guide rail 13 via the attachment member 14, the measurement apparatus 1 is arranged so that an orientation thereof is always the same. For example, the measurement apparatus 1 is arranged so that a certain surface thereof is always oriented horizontally.

The attachment member 14 may be fixed to the guide rail 13 by any method. For example, the attachment member 14 may be fixed to the guide rail 13 using a magnetic force. In another example, the attachment member 14 may be fixed to the guide rail 13 using a force of a spring. In another example, the attachment member 14 may sandwich the guide rail 13 to be fixed thereto.

After the measurement apparatus 1 is attached to the guide rail 13 above the car 12, a measurement by the measurement apparatus 1 is performed. Accordingly, first dimensional data on the shaft 8 is acquired. The first dimensional data is data including dimensional data on an upper part of the shaft 8. The first dimensional data at least includes dimensional data on an uppermost part of the shaft 8. Since the measurement apparatus 1 is arranged above the car 12, dimensional data on a lowermost part of the shaft 8 cannot be acquired in this measurement. Therefore, the first dimensional data does not include dimensional data on the lowermost part of the shaft 8.

Figure 5:
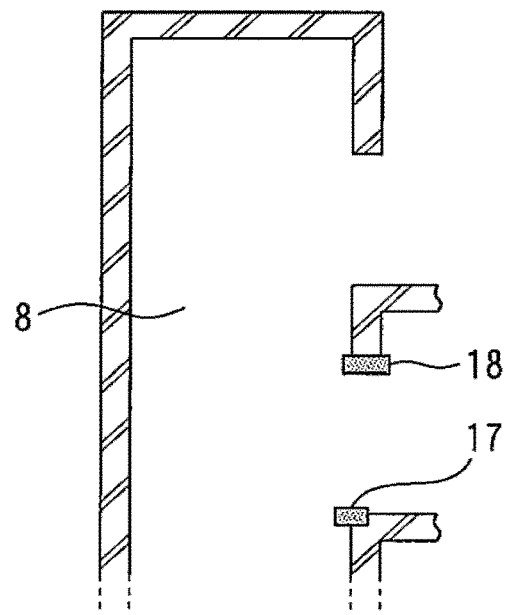
FIG. 5 is a diagram for explaining contents of first dimensional data.

FIG. 5 is a diagram for explaining contents of the first dimensional data. For example, the first dimensional data includes data indicating a lower surface of a top jamb 18 in a specific hall and data indicating an upper surface of the sill 17 in the hall. To include such data pieces in the first dimensional data, the measurement apparatus 1 is attached at a height which is lower than the lower surface of the top jamb 18 in the hall and which is higher than the upper surface of the sill 17 in the hall.

When the measurement by the measurement apparatus 1 is performed, the data acquisition unit 2 acquires the first dimensional data on the shaft 8. The first dimensional data on the shaft 8 acquired by the data acquisition unit 2 is stored in the storage unit 3.

After the first dimensional data on the shaft 8 is acquired, the measurement apparatus 1 is detached from the guide rail 13. After the measurement apparatus 1 is detached from the guide rail 13, the car 12 is moved upward and then stopped. For example, the car 12 is stopped in the upper part of the shaft 8. In FIG. 2, a car stopped at a stop position of the uppermost floor is denoted by a reference sign 12b.

When the car 12 is stopped in the upper part of the shaft 8, the measurement apparatus 1 is attached again to the guide rail 13 for the car 12. At this point, the measurement apparatus 1 is attached to the guide rail 13 below the car 12.

When the measurement apparatus 1 is attached to the guide rail 13 below the car 12, a measurement by the measurement apparatus 1 is performed. Accordingly, second dimensional data on the shaft 8 is acquired. The second dimensional data is data including dimensional data on the lower part of the shaft 8. The second dimensional data at least includes dimensional data on the lowermost part of the shaft 8. Since the measurement apparatus 1 is arranged below the car 12, dimensional data on the uppermost part of the shaft 8 cannot be acquired in this measurement. Therefore, the second dimensional data does not include dimensional data on the uppermost part of the shaft 8.

Figure 6:
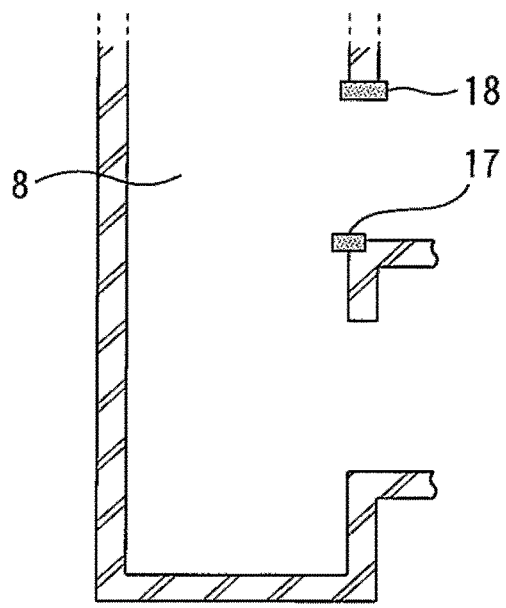
FIG. 6 is a diagram for explaining contents of second dimensional data.

FIG. 6 is a diagram for explaining contents of the second dimensional data. For example, the second dimensional data includes data indicating the lower surface of the top jamb 18 in the specific hall and data indicating the upper surface of the sill 17 in the hall. In other words, data indicating same locations is included in both the first dimensional data and the second dimensional data. To include such data pieces in the second dimensional data, the measurement apparatus 1 is attached at a height which is lower than the lower surface of the top jamb 18 in the hall and which is higher than the upper surface of the sill 17 in the hall.

When the measurement by the measurement apparatus 1 is performed, the data acquisition unit 2 acquires the second dimensional data on the shaft 8. The second dimensional data on the shaft 8 acquired by the data acquisition unit 2 is stored in the storage unit 3.

When both the first dimensional data and the second dimensional data on the shaft 8 are stored in the storage unit 3, the data integration unit 4 integrates the first dimensional data and the second dimensional data. Due to integration of the first dimensional data and the second dimensional data, dimensional data on the entire shaft 8 is created.

The data integration unit 4 performs the integration by matching common data included in both the first dimensional data and the second dimensional data. For example, the data integration unit 4 matches data indicating the lower surface of the top jamb 18 in the specific hall included in the first dimensional data with data indicating the lower surface of the top jamb 18 in the hall included in the second dimensional data. In addition, the data integration unit 4 matches data indicating the upper surface of the sill 17 in the specific hall included in the first dimensional data with data indicating the upper surface of the sill 17 in the hall included in the second dimensional data.

As described above, the installation precision of the guide rail 13 is extremely high and the guide section 16 is arranged over the range of vertical movement of the car 12 so that a predetermined distance from the sill 17 in the hall of each floor to the guide section 16 is maintained. In addition, a positional relationship between the sill 17 and the top jamb 18 in the hall is predetermined. By using data acquired with the guide rail 13 as a reference, even when data indicating a surface on which the same shape continues as in the case of a wall surface forming the shaft 8 is integrated, the integration can be readily performed. Hence, accurate dimensional data on the entire shaft 8 can be readily obtained.

The dimensional data on the entire shaft 8 created by the data integration unit 4 is stored in the storage unit 3.

The dimensional data on the entire shaft 8 stored in the storage unit 3 is compared with dimensional data at the time of completion of reform of the elevator. For example, the dimensional data at the time of completion of reform is input from the input apparatus 7. The comparison unit 5 compares the dimensional data input from the input apparatus 7 with the dimensional data on the entire shaft 8 stored in the storage unit 3. A comparison result provided by the comparison unit 5 is notified from the notification apparatus 6. For example, a difference between the dimensional data input from the input apparatus 7 and the dimensional data stored in the storage unit 3 is displayed on a display.

The interference determination system having the functions described above can perform a comparison with accurate dimensional data on the entire shaft 8. For example, when an elevator is reformed, information about an appropriate amount of scraping off a wall of the shaft 8 can be readily and accurately obtained.

The interference determination system having the functions described above may also be used in other applications. For example, the present interference determination system may be used to detect displacement of devices in the elevator after an occurrence of an earthquake. In this case, for example, dimensional data on the entire shaft 8 is stored in the storage unit 3 according to the procedure described above upon completion of installation of the elevator. In addition, dimensional data on the entire shaft 8 is stored in the storage unit 3 according to the procedure described above after reform of the elevator.

The measurement apparatus 1 is attached to the guide rail 13 after the occurrence of an earthquake. Alternatively, the measurement apparatus 1 is attached to the guide rail 13 in advance at a position where the measurement apparatus 1 does not interfere with the car 12. After the occurrence of the earthquake, a measurement by the measurement apparatus 1 is performed and dimensional data on the entire shaft 8 or a part of the shaft 8 is acquired. The comparison unit 5 compares dimensional data on shaft portions, which is acquired after the earthquake, with dimensional data on corresponding portions, which is stored in advance in the storage unit 3. A comparison result provided by the comparison unit 5 is notified from the notification apparatus 6. For example, a difference between the dimensional data acquired after the earthquake and dimensional data stored in advance in the storage unit 3 is displayed on a display.

FIG. 7 is a diagram showing a state where a device 19 in the shaft 8 has been displaced by an earthquake. FIG. 7(a) shows a state where a measurement by the measurement apparatus 1 is performed upon completion of installation of the elevator or after reform of the elevator. FIG. 7(b) shows a state where a measurement by the measurement apparatus 1 is performed after the occurrence of an earthquake. Dimensional data acquired by the measurement shown in FIG. 7(a) is stored in advance in the storage unit 3. The comparison unit 5 causes a display to display a difference between the dimensional data stored in the storage unit 3 and dimensional data acquired in the measurement shown in FIG. 7(*b*). Moreover, when distortion of the guide rail 13 occurs due to tremors of the earthquake, the abovementioned difference becomes extremely large. Therefore, an occurrence of an abnormality can be readily detected.

In the present embodiment, a case where the car 12 is initially moved to the lower part of the shaft 8 in the dimensional measurement of the shaft 8 has been described. This is merely an example. The car 12 may be initially moved to the upper part of the shaft 8. In this case, the measurement apparatus 1 is attached to the guide rail 13 below the car 12 and first dimensional data is acquired. The first dimensional data includes dimensional data on the lower part of the shaft 8. Subsequently, the car 12 is moved downward and stopped in the lower part of the shaft 8. The measurement apparatus 1 is attached to the guide rail 13 above the car 12 and second dimensional data is acquired. The second dimensional data includes dimensional data on the upper part of the shaft 8. Other procedures are the same as the procedures disclosed in the present embodiment.

Figure 8:
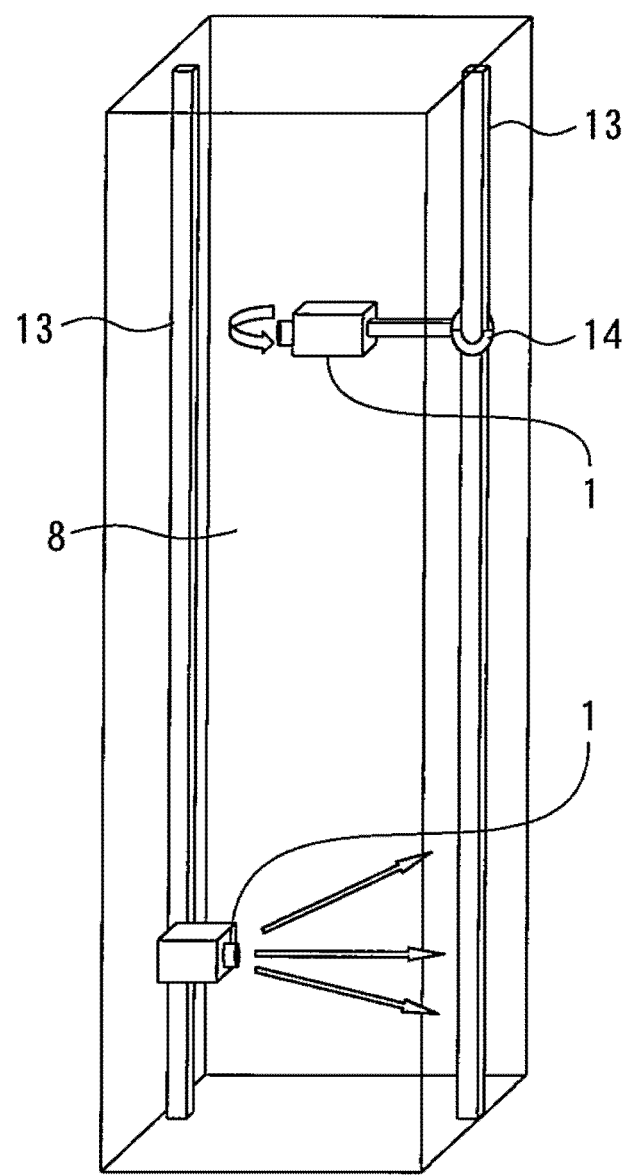
FIG. 8 is a diagram showing an example of attachment of the measurement apparatus.

FIG. 8 is a diagram showing an example of attachment of the measurement apparatus 1. In the present embodiment, a case where the measurement apparatus 1 is attached to the guide rail 13 in a central part of the shaft 8 has been described. As shown in FIG. 8, the measurement apparatus 1 may be attached to the guide rail 13 in the upper part or the lower part of the shaft 8.

In addition, in the present embodiment, a case where a comparison result provided by the comparison unit 5 is simply notified from the notification apparatus 6 has been described. However, a warning may be issued when a difference obtained by the comparison performed by the comparison unit 5 is larger than a reference value.

INDUSTRIAL APPLICABILITY

The present invention can be used when a dimensional measurement of a shaft is required.

REFERENCE SIGNS LIST

1 measurement apparatus, 2 data acquisition unit, 3 storage unit, 4 data integration unit, 5 comparison unit, 6 notification apparatus, 7 input apparatus, 8 shaft, 9 emission unit, 10 reception unit, 11 measurement unit, 12 car, 13 guide rail, attachment member, 14*a* guide surface, 15 flange section, 16 guide section, 16*a* guide surface, 17 sill, 18 top jamb, 19 device

The invention claimed is:

1. A method for measuring a shaft of an elevator, the method comprising:
 performing a measurement with a measurement apparatus on a side further toward one end of the shaft than a car of the elevator, and acquiring first dimensional data including dimensional data on the one end of the shaft, the car guided by a guide rail in the shaft;
 moving the car toward the one end of the shaft and then stopping the car;
 performing a measurement with the measurement apparatus on a side further toward the other end of the shaft than the car after the car is stopped, and acquiring second dimensional data including dimensional data on the other end of the shaft;
 integrating the acquired first dimensional data and the acquired second dimensional data, and creating dimensional data on the entire shaft;
 attaching the measurement apparatus to the guide rail in the shaft on the side further toward the one end of the shaft than the car before the first dimensional data is acquired;
 detaching the measurement apparatus from the guide rail after the first dimensional data is acquired and before the car is moved toward the one end of the shaft; and
 attaching the measurement apparatus to the guide rail on the side further toward the other end of the shaft than the car after the car is stopped and before the second dimensional data is acquired.

2. The method according to claim 1, wherein
 the one end of the shaft is an upper end, and
 the other end of the shaft is a lower end.

3. The method according to claim 1, wherein
 the one end of the shaft is a lower end, and
 the other end of the shaft is an upper end.

4. The method according to claim 1, wherein
 the first dimensional data includes data indicating a lower surface of a top jamb in a specific hall and data indicating an upper surface of a sill in the hall, and
 the second dimensional data includes data indicating the lower surface of the top jamb in the hall and data indicating the upper surface of the sill in the hall.

5. An interference determination system, comprising:
 circuitry configured to:
  store the dimensional data on the entire shaft created by the method according to claim 1; and
  compare dimensional data input from an input apparatus or dimensional data acquired by performing a measurement with a measurement apparatus with the stored dimensional data; and
 a display or speaker to issue a notification about a comparison result provided by the circuitry.

6. The interference determination system according to claim 5, wherein
 the measurement apparatus includes an emitter and a receiver,
 the emitter is provided to be rotatable around two axes, which are orthogonal to each other, and energy being emittable in an radial pattern from the emitter, and
 the receiver receives energy which is from the emitter and which is reflected by a measurement object.

7. The method according to claim 1, wherein the measurement apparatus is oriented to point away from the guide rail.

8. The method according to claim 1, wherein the measurement apparatus is located outside the car of the elevator.

9. A method for measuring a shaft of an elevator, the method comprising:
 (a): performing a measurement with the measurement apparatus on a side further toward one end of the shaft than a car of the elevator, and acquiring first dimensional data including dimensional data on the one end of the shaft, the car guided by a guide rail in the shaft;
 (b): moving the car toward the one end of the shaft and then stopping the car;
 (c): after (a) and (b), performing a measurement with the measurement apparatus on a side further toward the other end of the shaft than the car after the car is stopped, and acquiring second dimensional data including dimensional data on the other end of the shaft; and
 (d): after (a), (b) and (c), integrating the acquired first dimensional data and the acquired second dimensional data, and creating dimensional data on the entire shaft.

* * * * *

UNITED STATES PATENT AND TRADEMARK OFFICE
CERTIFICATE OF CORRECTION

PATENT NO. : 10,081,515 B2
APPLICATION NO. : 15/309454
DATED : September 25, 2018
INVENTOR(S) : Keisuke Sambongi et al.

Page 1 of 1

It is certified that error appears in the above-identified patent and that said Letters Patent is hereby corrected as shown below:

On the Title Page

Under Foreign Patent Documents, please add:
--JP 2005-098786 04/2005
WO 2014/027142 02/2014--

Under Other Publications, please add:
--Office Action issued April 25, 2018, in Chinese Patent Application No. 201580030536.0
(with English language translation).--

Signed and Sealed this
Twelfth Day of February, 2019

Andrei Iancu
*Director of the United States Patent and Trademark Office*